United States Patent
Chen et al.

(10) Patent No.: US 9,291,098 B2
(45) Date of Patent: Mar. 22, 2016

(54) TURBOMACHINE AND STAGED COMBUSTION SYSTEM OF A TURBOMACHINE

(71) Applicant: General Electric Company, Schenectady, NY (US)

(72) Inventors: Wei Chen, Greer, SC (US); Abdul Rafey Khan, Greenville, SC (US); Derrick Walter Simons, Greer, SC (US)

(73) Assignee: General Electric Company, Schenectady, NY (US)

( * ) Notice: Subject to any disclaimer, the term of this patent is extended or adjusted under 35 U.S.C. 154(b) by 548 days.

(21) Appl. No.: 13/676,683

(22) Filed: Nov. 14, 2012

(65) Prior Publication Data

US 2014/0130477 A1    May 15, 2014

(51) Int. Cl.
| | | |
|---|---|---|
| *F02C 3/22* | (2006.01) | |
| *F23R 3/34* | (2006.01) | |
| *F23R 3/36* | (2006.01) | |
| *F02C 7/228* | (2006.01) | |

(52) U.S. Cl.
CPC . *F02C 3/22* (2013.01); *F02C 7/228* (2013.01); *F23R 3/34* (2013.01); *F23R 3/36* (2013.01)

(58) Field of Classification Search
CPC .............. F02C 3/22; F02C 7/228; F23R 3/34; F23R 3/36
USPC ................................ 60/39.463, 733, 746, 776
See application file for complete search history.

(56) References Cited

U.S. PATENT DOCUMENTS

| | | | |
|---|---|---|---|
| 8,112,216 B2 | 2/2012 | Davis, Jr. et al. | |
| 2008/0264033 A1* | 10/2008 | Lacy et al. | 60/39.49 |
| 2010/0168980 A1* | 7/2010 | Fuller et al. | 701/100 |
| 2010/0170216 A1 | 7/2010 | Venkataraman et al. | |
| 2010/0170219 A1 | 7/2010 | Venkataraman et al. | |
| 2010/0170251 A1 | 7/2010 | Davis, Jr. et al. | |
| 2010/0170252 A1 | 7/2010 | Venkataraman et al. | |
| 2010/0170254 A1 | 7/2010 | Venkataraman et al. | |
| 2010/0174466 A1* | 7/2010 | Davis et al. | 701/100 |

(Continued)

FOREIGN PATENT DOCUMENTS

| | | |
|---|---|---|
| EP | 0346100 A1 | 12/1989 |
| EP | 0416132 A1 | 3/1991 |
| EP | 0421820 A3 | 7/1991 |

(Continued)

OTHER PUBLICATIONS

EP Search Report and Written Opinion dated Feb. 17, 2014 issued in connection with corresponding EP Patent Application No. 13192456.5.

(Continued)

*Primary Examiner* — J. Gregory Pickett
(74) *Attorney, Agent, or Firm* — Ernest G. Cusick; Frank A. Landgraff

(57) ABSTRACT

A turbomachine including a combustor in which fuel is combustible to produce a working fluid, a turbine section, which is receptive of the working fluid for power generation operations, a transition piece in which additional fuel is combustible, the transition piece being disposed to transport the working fluid from the combustor to the turbine section and a staged combustion system coupled to the combustor and the transition piece. The staged combustion system is configured to blend components of the fuel and the additional fuel in multiple modes.

15 Claims, 4 Drawing Sheets

(56) References Cited

U.S. PATENT DOCUMENTS

2012/0110974 A1* 5/2012 Davis et al. ............... 60/39.463
2012/0312024 A1* 12/2012 Davis et al. .................... 60/772

FOREIGN PATENT DOCUMENTS

| | | |
|---|---|---|
| EP | 0507060 A2 | 10/1992 |
| EP | 0505671 A3 | 3/1993 |
| EP | 0571233 A2 | 11/1993 |
| EP | 1845308 A2 | 10/2007 |
| EP | 1884714 A2 | 2/2008 |
| EP | 1985927 A2 | 10/2008 |
| EP | 1995444 A2 | 11/2008 |
| EP | 2204563 A2 | 7/2010 |
| EP | 2206961 A2 | 7/2010 |
| EP | 2206967 A3 | 3/2012 |
| JP | 61052523 A2 | 3/1986 |
| JP | 63061725 A2 | 3/1988 |
| JP | 2010159958 A2 | 7/2010 |
| JP | 2011242123 A2 | 12/2011 |
| RU | 2260155 C2 | 9/2005 |
| WO | 9943986 A1 | 9/1999 |
| WO | 0233318 A1 | 4/2002 |

OTHER PUBLICATIONS

US 8,019,523, 9/2011, Davis, Jr. et al. (withdrawn).

* cited by examiner

TURBOMACHINE AND STAGED COMBUSTION SYSTEM OF A TURBOMACHINE

BACKGROUND OF THE INVENTION

The subject matter disclosed herein relates to a turbomachine and a staged combustion system of a turbomachine.

A turbomachine may include a combustor, a turbine section and a transition piece. The combustor is formed to define an interior in which fuel and air are combustible to produce a working fluid. The turbine section is disposed downstream from the combustor and is formed to be receptive of at least the working fluid produced in the combustor for power generation operations. The transition piece is fluidly interposed between the combustor and the turbine section. As such, the transition piece is configured to transport the working fluid from the combustor 20 the turbine section.

The fuel used by the turbomachine can often be expensive, insufficiently volatile for a given turbomachine operation or excessively volatile for a given turbomachine operation. Generally, however, turbomachines lack fuel flexibility that would alleviate these concerns.

BRIEF DESCRIPTION OF THE INVENTION

According to one aspect of the invention, a turbomachine is provided and includes a combustor in which fuel is combustible to produce a working fluid, a turbine section, which is receptive of the working fluid for power generation operations, a transition piece in which additional fuel is combustible, the transition piece being disposed to transport the working fluid from the combustor to the turbine section and a staged combustion system coupled to the combustor and the transition piece. The staged combustion system is configured to blend components of the fuel and the additional fuel in multiple modes.

According to another aspect of the invention, a staged combustion system of a turbomachine is provided. The turbomachine includes a combustor in which fuel is combustible to produce a working fluid, a turbine section, which is receptive of the working fluid for power generation operations and a transition piece in which additional fuel is combustible. The transition piece is disposable to transport the working fluid from the combustor to the turbine section and includes head end injectors disposable to deliver fuel blended in multiple modes to a head end of the combustor and axially staged injectors disposable to deliver additional fuel blended in multiple modes to downstream sections of the combustor and the transition piece.

According to yet another aspect of the invention, a method of operating a turbomachine is provided and includes combusting fuel in a combustor to produce a working fluid, transporting the working fluid from the combustor and through a transition piece, combusting additional fuel in the transition piece and blending components of the fuel and the additional fuel in multiple modes.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

In accordance with aspects, a turbomachine and an axially staged combustion system of a turbomachine are provided. This will allow for increasingly fuel flexible turbomachine operations, turbomachine operations with a relatively wide Wobbie index, increased flash back margins and increased control of thermal acoustics.

Figure 1:
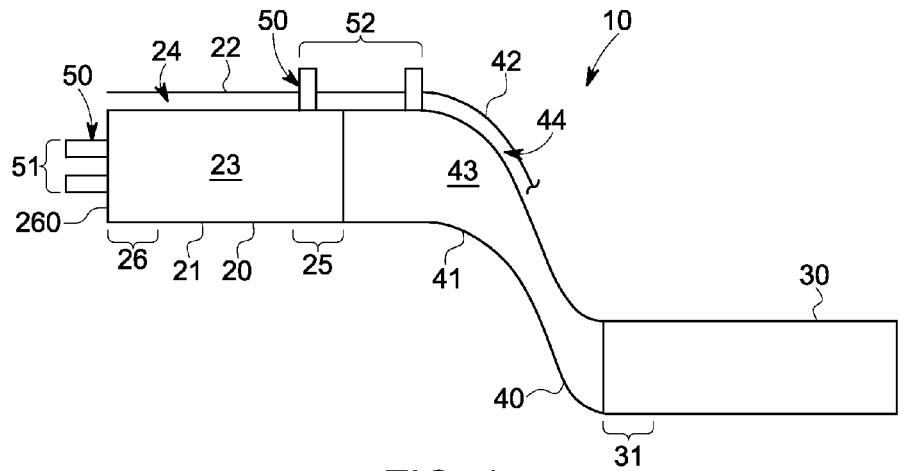
FIG. 1 is a schematic side view of a turbomachine.
Figure 2:
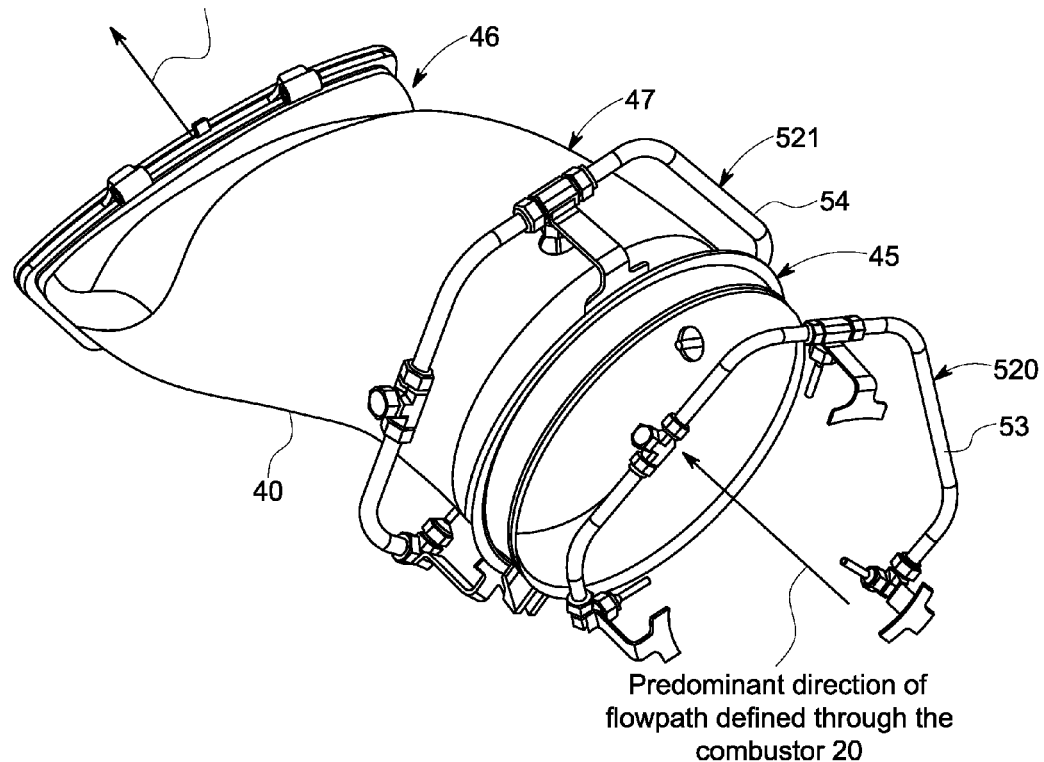
FIG. 2 is a perspective view of a transition piece and components of a staged combustion system of a turbomachine.

With reference to FIGS. 1 and 2, a turbomachine 10 is provided. The turbomachine includes a combustor 20, a turbine section 30, a transition piece 40 and an axially staged combustion system 50. The combustor 20 includes a liner 21 and a flow sleeve 22. The liner 21 is formed to define an interior 23 in which fuel and air are combustible to produce a working fluid. The flow sleeve 22 is disposed around the liner 21 to define a first air flow pathway 24. The turbine section 30 is disposed downstream from the combustor 20 and is formed to be receptive of at least the working fluid produced in the combustor 20 for power generation operations.

The transition piece 40 is fluidly interposed between downstream sections 25 of the combustor 20 and a forward stage 31 of the turbine section 30. As such, the transition piece 40 is configured to transport the working fluid from the combustor 20 to the turbine section 30. The transition piece 40 includes a liner 41 and an impingement sleeve 42. The liner 41 is formed to define an interior 43 through which the working fluid is transported from the combustor 20 to the turbine section 30. The impingement sleeve 42 is disposed around the liner 41 to define a second air flow pathway 44, which may be communicative with the first air flow pathway 24.

As shown in FIG. 2, the transition piece 40 includes a forward end 45 that is connectible to the combustor 20 and is generally aligned with a predominant direction of a flowpath defined through the combustor 20, an aft end 46 that is connectible to the turbine section 30 and generally aligned with a predominant direction of a flowpath through the turbine section 30 and a central portion 47. The central portion 47 extends from the forward end 45 to the aft end 46. The forward end 45 may be generally annular in shape in correspondence with a similar shape of the downstream sections 25 of the combustor 20. The aft end 46 may be elongate in a circumferential dimension relative to a rotor of the turbomachine 10. The central portion 47 is formed such that the annular shape of the forward end 45 gradually changes to the elongate shape of the aft end 46. In addition, the central portion 47 may include a radial curvature relative to the rotor such that the aft end 46 is disposed radially inwardly from the forward end 45.

In accordance with embodiments, the flowpath through the combustor 20 may be offset from the flowpath through the turbine section 30. The curved formation of the transition piece 40 permits fluid flow from the combustor 20 to the turbine section 30 despite the offset.

The turbomachine 10 may be configured to perform axially staged injection or late lean injection (LLI) of fuel and/or air in the downstream sections 25 of the combustor 20 and the transition piece 40. In such cases, additional fuel may be received by and combustible within the downstream sections 25 of the combustor 20 and the interior 43 of the transition piece 40. As a result of the use of axially staged injection or LLI techniques, a more complete combustion of fuel and additional fuel may be achieved as compared to what would otherwise be possible. This can allow for the use of high and/or low heating value fuels in the combustor 20 and the transition piece 40, which may reduce fuel costs for turbomachine 10 operations and lead to a decrease in pollutant (e.g., oxides of nitrogen) emissions from the turbomachine 10 as a whole even where low heating value fuels are used in the combustor 20.

The axially staged combustion system 50 may be coupled to one or both of the combustor 20 and the transition piece 40. The axially staged combustion system 50 is configured to blend components of both the fuel and the additional fuel in multiple modes of turbomachine 10 operation such that the fuel and the additional fuel can be advantageously injected into the combustor 20 and the transition piece 30. The axially staged combustion system 50 includes head end injectors 51 and axially staged injectors 52. The head end injectors 51 are disposable to deliver the fuel to a head end 26 of the combustor 20, which is defined upstream from the downstream sections 25 of the combustor 20. The head end 26 may include an end plate 260 to which the head end injectors 51 are attachable in various configurations. The axially staged injectors 52 are disposable to deliver the additional fuel to the downstream sections 25 of the combustor 20 and to the transition piece 30.

The axially staged injectors 52 may be arranged in at least a first stage 520 and a second stage 521, which is disposed downstream from the first stage 520. Three or more axially staged injectors 52 may be disposed at the first stage 520 and may be arranged about the downstream sections 25 of the combustor 20 in a substantially even circumferential distribution. A first fuel manifold 53 may be provided to supply the axially staged injectors 52 of the first stage 520 with the additional fuel. Similarly, three or more axially staged injectors 52 may be disposed at the second stage 521 and may be arranged about the transition piece 30 in a substantially even circumferential distribution. A second fuel manifold 54 may be provided to supply the axially staged injectors 52 of the second stage 521 with the additional fuel. As shown in FIG. 2, the second fuel manifold 54 and the axially staged injectors 52 of the second stage 521 may be disposed at an axial location just forward from the beginning of the radial curvature of the transition piece 30.

In accordance with embodiments, the first and second fuel manifolds 53 and 54 may be coupled to one another and to fuel circuits, which will be described below and which may also be coupled to the head end injectors 51. The fuel circuits may be configured to access various types of fuels and to provide the various types of the fuels to the head end injectors 51 and to the axially staged injectors 52. As such, the fuels circuit may be configured to provide various blends of the fuel to the head end injectors 51 and to provide various blends of the additional fuel to the axially staged injectors. In accordance with embodiments, the various blends of the additional fuel supplied to the axially staged injectors 52 of the first stage 520 may be similar to or different from the various blends of the additional fuel supplied to the axially staged injectors 52 of the second stage 521.

A determination of the respective blend(s) of the fuel and the additional fuel to be supplied to the head end injectors 51 and the axially staged injectors 52 may be made in accordance with the one of the multiple modes of turbomachine 10 operation currently in effect. Each one of the multiple modes of turbomachine 10 operation can be employed interchangeably with the others or in accordance with pre-defined schedules and/or specific turbomachine 10 loads. The ability of the turbomachine 10 to operate in the multiple modes of turbomachine 10 operation provides for fuel flexibility, operations at relatively wide Wobbie indices and increased flash back margin.

In accordance with embodiments, the multiple modes comprise one or more of at least first through fourth modes. In the first mode, the head end injectors 51 deliver natural gas as the fuel to the head end 26 of the combustor 20 and the axially staged injectors 52 deliver syngas or a low heating value gas as the additional fuel to the downstream sections 25 of the combustor 20 and the transition piece 30. In the second mode, the head end injectors 51 deliver natural gas and syngas as the fuel to the head end 26 of the combustor 20 and the axially staged injectors 52 deliver a low heating value gas as the additional fuel to the downstream sections 25 of the combustor 20 and the transition piece 30. In the third mode, the head end injectors 51 deliver a low heating value gas as the fuel to the head end 26 of the combustor 20 and the axially staged injectors 52 deliver natural gas or a low heating value gas as the additional fuel to the downstream sections 25 of the combustor 20 and the transition piece 30. In the fourth mode, the head end injectors 51 deliver a first blend of natural gas and a low heating value gas (e.g., a blend level of about 10%-50% of natural gas) as the fuel to the head end 26 of the combustor 20 and the axially staged injectors 52 deliver a second blend of natural gas and a low heating value gas (e.g., a blend level of about 10%-50% of natural gas) as the additional fuel to the downstream sections 25 of the combustor 20 and the transition piece 30.

Figure 3:
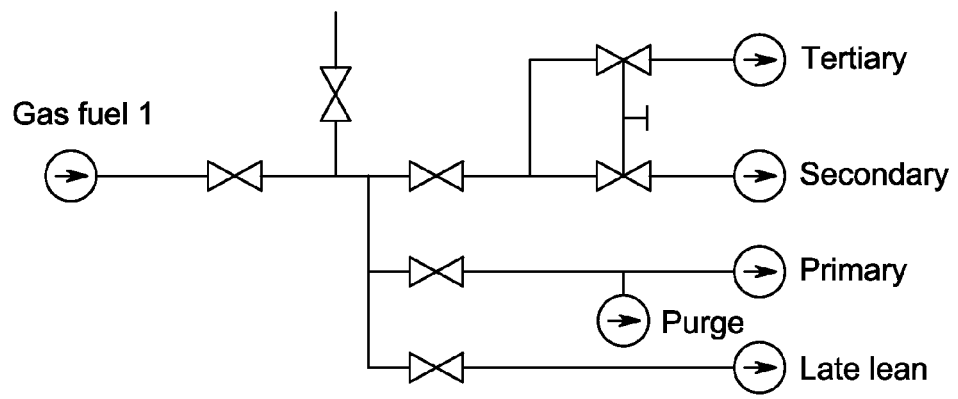
FIG. 3 is a schematic illustration of a fuel circuit of the turbomachine of FIG. 1.
Figure 4:
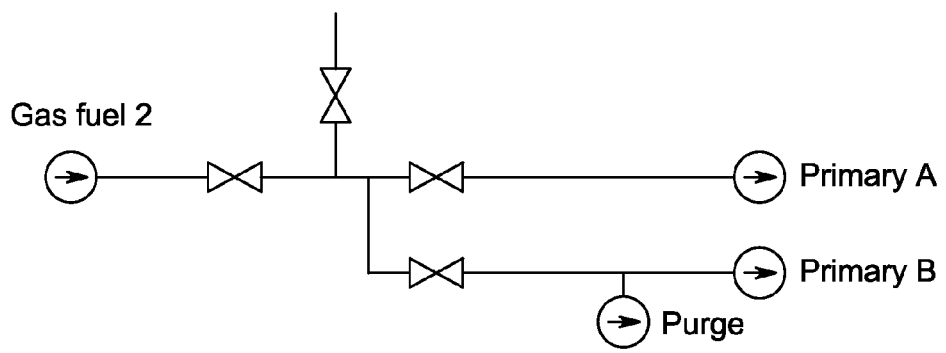
FIG. 4 is a schematic illustration of another fuel circuit of the turbomachine of FIG. 1.
Figure 5:
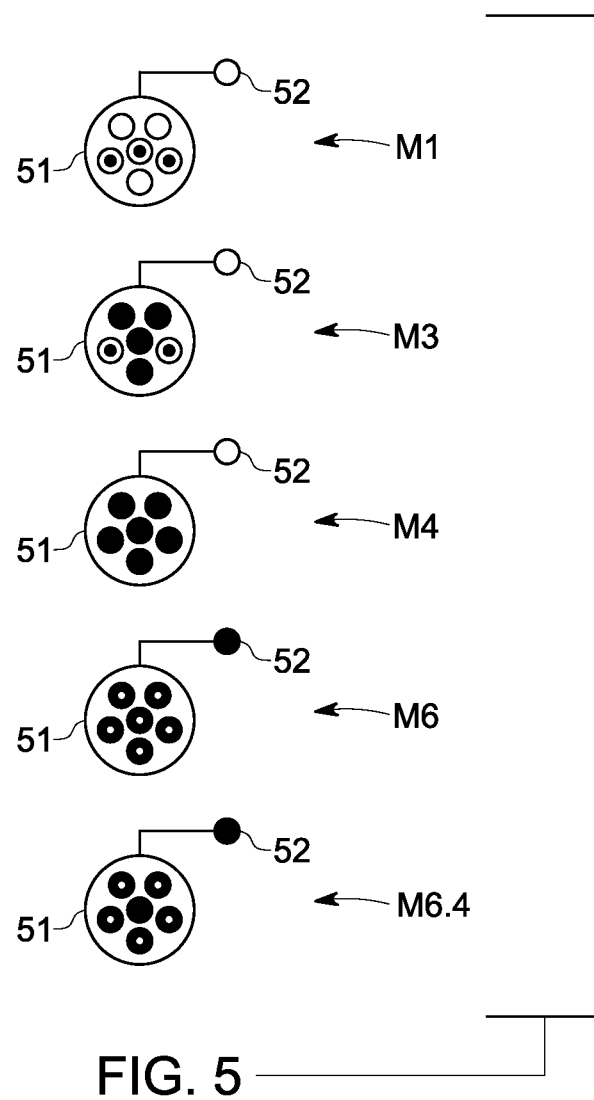
FIG. 5 is a flow diagram illustrating modes of fuel injection in accordance with various embodiments.

In accordance with alternative embodiments and, with reference to FIGS. 3-5, fuel circuits and further operational modes of the turbomachine 10 are illustrated.

With reference to FIG. 3, gas fuel 1 may be purged, provided for combustion via the head end injectors 51 in primary, secondary or tertiary arrangements and/or provided for combustion via the axially staged injectors 52. Gas fuel 1 may include one or more types of high heating value fuel, such as natural gas or methane. The primary, secondary and tertiary arrangements refer to sets of the fuel nozzles of the head end fuel injectors 51 that are activated at one time and to the level of activation of the fuel nozzles (i.e., a center burner may be activated, outer annulus burners may be activated or the center burner and the outer annulus burners may be activated).

With reference to FIG. 4, gas fuel 2 may be purged and/or provided for combustion via the head end injectors 51 in primary A or primary B arrangements. Gas fuel 2 may include one or more types of low heating value fuel, such as syngas. As above, the primary A and primary B arrangements refer to sets of the fuel nozzles of the head end fuel injectors 51 that are activated at one time and to the level of activation of the fuel nozzles (i.e., a center burner may be activated, outer annulus burners may be activated or the center burner and the outer annulus burners may be activated).

With reference to FIG. 5, the turbomachine 10 may be operated in modes M1, M3, M4, M6 and M6.4. Modes M2 and M5 are not shown but can be understood as being intermediate modes where modes M1 and M3 overlap and modes M4 and M6 overlap, respectively.

In the M1 (i.e., a first or startup) mode, which may be in effect up to about 81% of turbomachine 10 speed, gas fuel 1 is provided for combustion (in, for example, combustor 20) via the head end injectors 51 in the secondary arrangement. As shown in FIG. 5, the secondary arrangement includes activation of the center burner in the central fuel nozzle and two outer fuel nozzles of the head end injectors 51.

In the M3 (i.e., a second or additional startup) mode, which may be in effect until a fire temperature of the combustion reaches about 2,200° F., gas fuel 1 is provided for combustion via the head end injectors 51 in the secondary arrangement and the gas fuel 2 is provided for combustion via the head end injectors 51 in the primary A arrangement. As shown in FIG. 5, the primary A arrangement includes activation of the outer annulus burners of the central fuel nozzle and activation of the center burner and the outer annulus burners of the remaining three outer fuel nozzles of the head end injectors 51.

In the M4 (i.e., a third or full startup) mode, which may be in effect until the turbomachine 10 reaches 100% speed, gas fuel 1 is provided for combustion via the head end injectors 51 in the secondary arrangement and the gas fuel 2 is provided for combustion via the head end injectors 51 in the primary A arrangement and in the primary B arrangement. As shown in FIG. 5, the primary B arrangement includes activation of the center burner and the outer annulus burners of each of the fuel nozzles of the head end injectors 51.

In the M6 (i.e., a fourth or base load) mode, gas fuels 1 and 2 are provided for combustion via the head end injectors 51 in the tertiary, primary A and primary B arrangements while gas fuel 1 is further provided to the axially staged injectors 52. As shown in FIG. 5, the tertiary, primary A and primary B arrangements include activation of the outer annulus burners of each of the fuel nozzles of the head end injectors 51.

In the M6.4 (i.e., a fifth or overfire) mode, gas fuels 1 and 2 are provided for combustion via the head end injectors 51 in the primary, secondary, tertiary, primary A and primary B arrangements while gas fuel 1 is further provided to the axially staged injectors 52. As shown in FIG. 5, the primary, secondary, tertiary, primary A and primary B arrangements include activation of the outer annulus burners of each of the fuel nozzles and the additional activation of the center burner of the center fuel nozzle of the head end injectors 51.

During turndown of the turbomachine 10 from operation in the M6 mode, the turbomachine 10 may proceed from the M6 mode to the M4 mode and from the M4 mode to the M3 mode.

Figure 6:
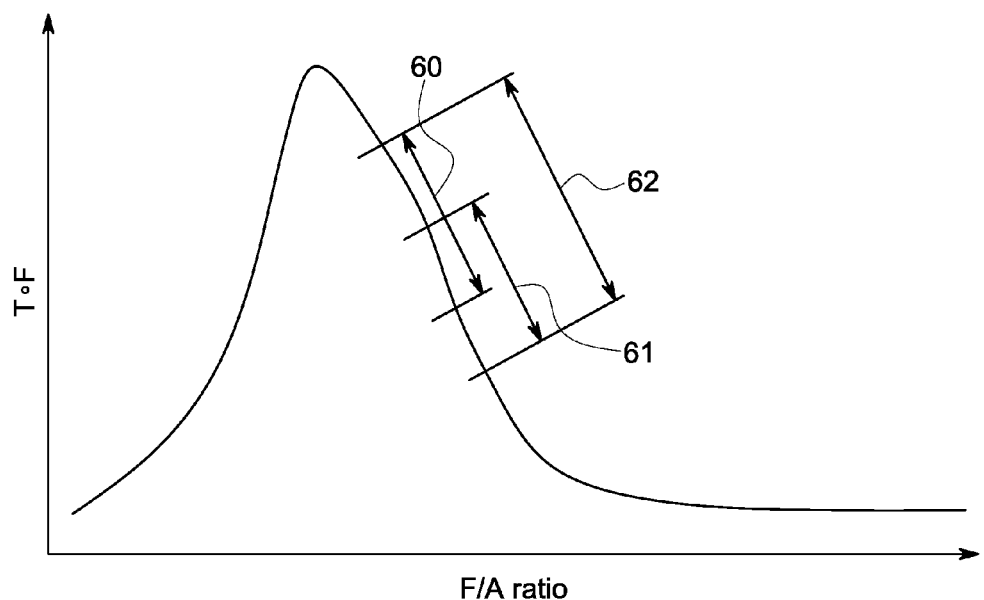
FIG. 6 is a graphical depiction of an improvement in a Wobbie index operation window.

With reference to FIG. 6, a graphical depiction of an improvement in the Wobbie index operation window afforded by the operation of the turbomachine 10 as described above is illustrated. As shown in FIG. 6, as the fuel/air ratio increases within the combustor 20 and the transition piece 40, the operational temperatures of the turbomachine 10 increase sharply, reach a high temperature and then reduce nearly as sharply. During the reduction period and, in accordance with Wobbie index values, a low heating value fuel can be employed for combustion during the first, relatively high temperature window 60 whereas a high heating value fuel can be employed during the second, relatively cool temperature window 61. The capability of the turbomachine 10 described above to conduct fuel flexible operations makes it possible for the turbomachine 10 to be effectively operable along the wide temperature window 62, which extends from the onset of the first, relatively high temperature window 60 to the termination of the second, relatively cool temperature window 61.

Figure 7:
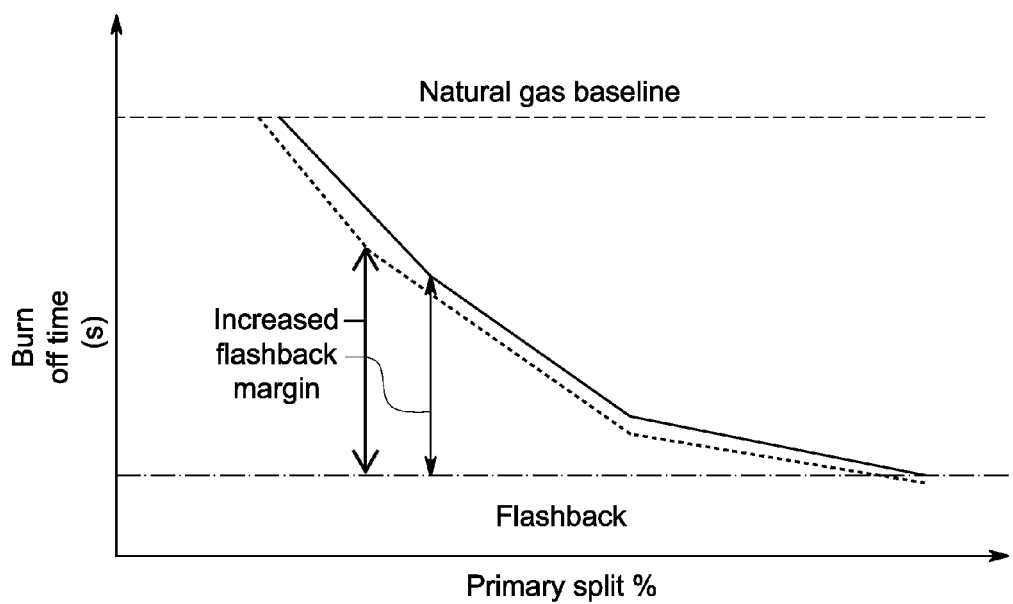
FIG. 7 is a graphical depiction of an improvement in flameholding capabilities.

With reference to FIG. 7, is a graphical depiction of an improvement in flameholding capabilities afforded by the operation of the turbomachine 10 as described above is illustrated. As shown in FIG. 7, an operational region between a high flashback risk and a natural gas baseline can be seen between the two dotted lines. The respective areas between the lower dotted line and the dashed and solid lines represent flashback margins associated with fuel types having given percentages of a high heating value fuel, such as 10% and 20% natural gas, respectively. The size and shape of these areas indicate that the flashback margin increases, for the given natural gas percentages, as a primary split percentage decreases and a burn off time increases. Indeed, the effect is more pronounced as the natural gas percentage decreases. Thus, it is seen that the ability of the turbomachine 10 to employ fuel flexibility and to thereby use a decreased natural gas percentage in a fuel type leads to a decreased risk of flashback or flameholding.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A turbomachine, comprising:
a combustor in which fuel is combustible to produce a working fluid;
a turbine section, which is receptive of the working fluid for power generation operations;
a transition piece in which additional fuel is combustible, the transition piece being disposed to transport the working fluid from the combustor to the turbine section; and
a staged combustion system coupled to the combustor and the transition piece, the staged combustion system being configured to blend components of the fuel and the additional fuel in multiple modes, wherein the staged combustion system comprises:
head end injectors disposable to deliver the fuel to a head end of the combustor; and
axially staged injectors disposable to deliver the additional fuel to downstream sections of the combustor and the transition piece; and
wherein the multiple modes comprise one or more of:
a first mode in which the head end injectors deliver natural gas as the fuel to the head end of the combustor and the axially staged injectors deliver syngas or a low heating value gas as the additional fuel to the downstream sections of the combustor and the transition piece;
a second mode in which the head end injectors deliver natural gas and syngas as the fuel to the head end of the combustor and the axially staged injectors deliver a low heating value gas as the additional fuel to the downstream sections of the combustor and the transition piece;
a third mode in which the head end injectors deliver a low heating value gas as the fuel to the head end of the combustor and the axially staged injectors deliver natural gas or a low heating value gas as the additional fuel to the downstream sections of the combustor and the transition piece; and a fourth mode in which the head end injectors deliver natural gas and a low heating value gas as the fuel to the head end of the combustor and the axially staged injectors deliver natural gas and a low heating value gas as the additional fuel to the downstream sections of the combustor and the transition piece, wherein the head end injectors comprise:

a central fuel nozzle, which includes a center burner and outer annulus burners arrayed around the center burner; and outer fuel nozzles arrayed around the central fuel nozzle, each outer fuel nozzle including a center burner and outer annulus burners array around the center burner.

2. The turbomachine according to claim 1, wherein the transition piece is curved.

3. The turbomachine according to claim 1, wherein a flowpath through the combustor is offset from a flowpath through the turbine section, the transition piece comprising:

a forward end aligned with the flowpath through the combustor; and an aft end aligned with the flowpath through the turbine section.

4. The turbomachine according to claim 1, wherein the axially staged injectors are arranged in a first stage and a second stage disposed downstream from the first stage, wherein:

the first stage is proximate to and forward of a connection between the combustor and the transition piece, and the second stage is forward of a radial curvature of the transition piece.

5. The turbomachine according to claim 4, further comprising:

a first fuel manifold to supply the axially staged injectors of the first stage with the additional fuel; and a second fuel manifold to supply the axially staged injectors of the second stage with the additional fuel, the transition piece having a curvature from a forward end aligned with the combustor to an aft end aligned with the turbine section and the first and second fuel manifolds being disposed forward of the curvature.

6. The turbomachine according to claim 1, wherein the multiple modes comprise startup, base load and overfire modes.

7. A staged combustion system of a turbomachine including a combustor in which fuel is combustible to produce a working fluid, a turbine section, which is receptive of the working fluid for power generation operations and a transition piece in which additional fuel is combustible, the transition piece being disposable to transport the working fluid from the combustor to the turbine section and comprising:

head end injectors disposable to deliver fuel blended in multiple modes to a head end of the combustor;

axially staged injectors disposable to deliver additional fuel blended in multiple modes to downstream sections of the combustor and the transition piece; and a plurality of couplings by which the axially staged combustors are coupled to the downstream sections of the combustor and to the transition piece; and wherein the head end injectors comprise:

a central fuel nozzle, which includes a center burner and outer annulus burners arrayed around the center burner; and outer fuel nozzles arrayed around the central fuel nozzle, each outer fuel nozzle including a center burner and outer annulus burners array around the center burner, and the multiple modes comprise:

a first mode in which the head end injectors deliver natural gas as the fuel to the head end of the combustor via only the center burner of the central fuel nozzle and two of the outer fuel nozzles and the axially staged injectors deliver syngas or a low heating value gas as the additional fuel to the downstream sections of the combustor and the transition piece;

a second mode in which the head end injectors deliver natural gas and syngas as the fuel to the head end of the combustor via the center and outer annulus burners of the central fuel nozzle and three of the outer fuel nozzles and only the center burner of two of the outer fuel nozzles and the axially staged injectors deliver a low heating value gas as the additionsl fuel to the dowmsteam sections of the combustor and the transition piece;

a third mode in which the head end injectors deliver a low heating value gas as the fuel to the head end of the combustor via the center and outer annulus burners of the central fuel nozzle and all of the outer fuel nozzles and the axially staged injectors deliver natural gas or a low heating value gas as the additional fuel to the downstream sections of the combustor and the transition piece;

a fourth mode in which the head end injectors deliver natural gas and a low heating value gas as the fuel to the head end of the combustor via only the outer annulus burners of the central fuel nozzle and all of the outer fuel nozzles and the axially staged injectors deliver natural gas and a low heating value gas as the additional fuel to the downstream sections of the combustor and the transition piece; and a fifth mode in which the head end injectors deliver natural gas and a low heating value gas as the fuel to the head end of the combustor via the central and outer annulus burners of the central fuel nozzle and only the outer annulus burners of all of the outer fuel nozzles and the axially staged injectors deliver natural gas and a low heating value gas as the additional fuel to the downstream sections of the combustor and the transition piece.

8. The staged combustion system according to claim 7, wherein the axially staged injectors are arranged in a first stage and a second stage disposed downstream from the first stage.

9. The staged combustion system according to claim 8, further comprising:

a first fuel manifold to supply the axially staged injectors of the first stage with the additional fuel; and a second fuel manifold to supply the axially staged injectors of the second stage with the additional fuel, the transition piece having a curvature from a forward end aligned with the combustor to an aft end aligned with the turbine section and the plurality of couplings and first and second fuel manifolds being disposed forward of the curvature.

10. The staged combustion system according to claim 7, wherein the multiple modes comprise startup, base load and overfire modes.

11. The staged combustion system according to claim 7, wherein the transition piece comprises:

a forward end connected to the combustor and aligned with a predominant direction of a flowpath defined through the combustor;

an aft end connected to the turbine section and aligned with a predominant direction of a flowpath through the turbine section; and a central portion extending from the forward end to the aft end and including a curvature relative to a rotor such that the aft end is disposed radially inwardly from the forward end, the plurality of couplings being located forward of the curvature of the central portion.

12. A method of operating a turbomachine, comprising:

combusting fuel in a combustor to produce a working fluid by delivering the fuel to a head end of the combustor via head end injectors;

transporting the working fluid from the combustor and through a transition piece;

combusting additional fuel in the transition piece by delivering the additional fuel to downstream sections of the combustor and the transition piece via axially staged injectors; and blending components of the fuel and the additional fuel in multiple modes, wherein the multiple modes comprise one or more of:

a first mode in which the head end injectors deliver natural gas as the fuel to the head end of the combustor and the axially staged injectors deliver syngas or a low heating value gas as the additional fuel to the downstream sections of the combustor and the transition piece;

a second mode in which the head end injectors deliver natural gas and syngas as the fuel to the head end of the combustor and the axially staged injectors deliver a low heating value gas as the additional fuel to the downstream sections of the combustor and the transition piece;

a third mode in which the head end injectors deliver a low heating value gas as the fuel to the head end of the combustor and the axially staged injectors deliver natural gas or a low heating value gas as the additional fuel to the downstream sections of the combustor and the transition piece; and a fourth mode in which the head end injectors deliver natural gas and a low heating value gas as the fuel to the head end of the combustor and the axially staged injectors deliver natural gas and a low heating value gas as the additional fuel to the downstream sections of the combustor and the transition piece.

13. The method according to claim 12, further comprising arranging the axially staged injectors in a first stage and a second stage disposed downstream from the first stage.

14. The method according to claim 13, further comprising:

supplying the axially staged injectors of the first stage with the additional fuel via a first manifold; and supplying the axially staged injectors of the second stage with the additional fuel via a second manifold.

15. The method according to claim 12, wherein the multiple modes comprise startup, base load and overfire modes.

* * * * *